United States Patent
Hirose et al.

(10) Patent No.: US 10,550,275 B2
(45) Date of Patent: Feb. 4, 2020

(54) UV-LED CURABLE CLEAR INK COMPOSITION FOR INK JET PRINTING

(71) Applicant: SAKATA INX CORP., Osaka-shi, Osaka (JP)

(72) Inventors: Tadashi Hirose, Osaka (JP); Kazuhiro Fuke, Osaka (JP)

(73) Assignee: SAKATA INX CORP., Osaka (JP)

( * ) Notice: Subject to any disclaimer, the term of this patent is extended or adjusted under 35 U.S.C. 154(b) by 0 days.

(21) Appl. No.: 15/325,668

(22) PCT Filed: Jul. 2, 2015

(86) PCT No.: PCT/JP2015/069143
§ 371 (c)(1),
(2) Date: Jan. 11, 2017

(87) PCT Pub. No.: WO2016/009848
PCT Pub. Date: Jan. 21, 2016

(65) Prior Publication Data
US 2017/0158890 A1 Jun. 8, 2017

(30) Foreign Application Priority Data
Jul. 15, 2014 (JP) .................... 2014-145396

(51) Int. Cl.
| *C09D 11/38* | (2014.01) |
| *C09D 11/30* | (2014.01) |
| *C09D 11/101* | (2014.01) |
| *B41J 2/01* | (2006.01) |
| *B41M 5/00* | (2006.01) |
| *B41J 11/00* | (2006.01) |
| *C09D 11/107* | (2014.01) |

(52) U.S. Cl.
CPC ............. *C09D 11/101* (2013.01); *B41J 2/01* (2013.01); *B41J 11/002* (2013.01); *B41M 5/00* (2013.01); *C09D 11/107* (2013.01); *C09D 11/30* (2013.01); *C09D 11/38* (2013.01)

(58) Field of Classification Search
CPC ....... C09D 11/30; C09D 11/38; C09D 11/101; C09D 11/107; B41J 2/01; B41J 11/002
See application file for complete search history.

(56) References Cited

U.S. PATENT DOCUMENTS

| 2011/0234681 A1 | 9/2011 | Nakane |
| 2011/0251298 A1 | 10/2011 | Kagose et al. |
| 2012/0147095 A1 | 6/2012 | Miura et al. |
| 2012/0208915 A1 | 8/2012 | Hayata et al. |
| 2012/0270018 A1 | 10/2012 | Mizutani et al. |
| 2012/0274717 A1 | 11/2012 | Nakano et al. |
| 2013/0258015 A1 | 10/2013 | Mizutaki et al. |
| 2015/0284579 A1 | 10/2015 | Mizutani et al. |
| 2015/0291819 A1 | 10/2015 | Mizutani et al. |
| 2015/0315394 A1 | 11/2015 | Miura et al. |

FOREIGN PATENT DOCUMENTS

| CN | 102459479 | 5/2012 | |
| EP | 2913370 | 9/2015 | |
| EP | 2924080 | 9/2015 | |
| JP | 2009035650 | 2/2009 | |
| JP | 2011057744 | 3/2011 | |
| JP | 2011137069 | 7/2011 | |
| JP | 2011177964 A | * 9/2011 | ............... C09D 4/00 |
| JP | 2013503931 | 2/2013 | |
| JP | 2013159707 | 8/2013 | |
| JP | 2013203873 | 10/2013 | |
| WO | 2010143738 | 12/2010 | |
| WO | 2011104913 | 9/2011 | |
| WO | 2014065362 | 5/2014 | |
| WO | 2014080942 | 5/2014 | |

OTHER PUBLICATIONS

International Search Report, International Application No. PCT/JP2015/069143 dated Oct. 6, 2015.
Supplementary European Search Report, European Application No. 15822064.0, dated Jan. 15, 2018.
Office Action, European Application No. 15822064.0-1102 dated Dec. 18, 2018.

* cited by examiner

*Primary Examiner* — Sanza L. McClendon
(74) *Attorney, Agent, or Firm* — Perman & Green

(57) ABSTRACT

An UV-LED curable clear ink composition for ink jet printing including 44 to 80% by mass of a photo-polymerizable mono-functional monomer, 15 to 50% by mass of a photo-polymerizable poly-functional monomer and 5 to 15% by mass of an acylphosphine photo-polymerization initiator, and having a viscosity at 25° C. of 1 to 50 mPa·s, wherein the photo-polymerizable mono-functional monomer and the photo-polymerizable poly-functional monomer include a photo-polymerizable monomer having at least one of functional groups including an amide group and an amino group, and the photo-polymerizable monomer is contained in an amount of 5 to 20% by mass based on a total amount of photo-polymerizable mono-functional monomer and photo-polymerizable poly-functional monomer.

1 Claim, No Drawings

UV-LED CURABLE CLEAR INK COMPOSITION FOR INK JET PRINTING

CROSS REFERENCE TO RELATED APPLICATIONS

This application is the National Stage of International Application No. PCT/JP2015/069143 having International Filing Date, 2 Jul. 2015, which designated the United States of America, and which International Application was published under PCT Article 21(2) as WO Publication No. 2016/009848 A1, and which claims priority from, and the benefit of, Japanese Application No. 2014-145396, filed on 15 Jul. 2014, the disclosures of which are incorporated herein by reference in their entireties.

BACKGROUND

1. Field

The presently disclosed embodiment relates to an UV-LED curable clear ink composition for ink jet printing. In particular, the presently disclosed embodiment relates to an UV-LED curable clear ink composition for ink jet printing which is excellent in curability (UV-LED curability) by ultraviolet light (UV) using a light emitting diode (LED) as a light source, ejection stability, and adhesion to a substrate and scratch resistance of an obtained cured coating film, and assures that yellowing of the cured coating film is hardly generated.

2. Brief Description of Related Developments

In an ink jet recording apparatus, a method (an ink jet method) of ejecting ink from a nozzle and adhering the ink on a substrate. In this method, the nozzle and the substrate are in a non-contacted state. Therefore according to this method, satisfactory printing can be performed on surfaces of a vinyl chloride resin sheet, a tarpaulin sheet of a composite material, substrates having irregular shapes such as a curve, a convex and a concave, and the like. As a result, an opportunity of using an ink jet recording apparatus in the fields of industrial application such as a large size outdoor advertisement having a large image area is increasing. Known examples of ink composition for ink jet printing to be used in such an ink jet recording apparatus include an aqueous ink composition for ink jet printing, an oil ink composition for ink j et printing and an ultraviolet light curable ink composition for ink jet printing to be curable by ultraviolet light or the like. Among these, an ultraviolet light curable ink composition for ink jet printing is excellent in drying characteristics and curability of a coating film even in the case of a non-absorbable substrate.

However, in an image formed by an ink jet method, a surface of the image becomes uneven, and uneven brightness which results from a difference in a reflectance between the substrate portion not printed with ink and the ink-printed image portion is likely to arise. Therefore, quality of the image formed by an ink jet method is deteriorated due to such uneven surface and uneven brightness. In addition, in the image formed by an ink jet method, its smoothness is apt to be deteriorated by the formed uneven surface, and it is difficult to increase brightness.

Therefore, in order to eliminate such uneven brightness and low brightness, there was proposed a technology of printing, after printing on a substrate, an ultraviolet light-curable clear ink composition for ink jet printing by an ultraviolet light-curable ink jet printing method. According to this technology, a surface of an obtained image is homogenized, smoothness is increased, uneven brightness is eliminated, and a brightness is increased.

Meanwhile, high energy light sources such as a metal halide lamp have been used as a light source for curing an ultraviolet light-curable ink composition for ink jet printing. When an image is cured by using such a lamp, there are problems with generation of ozone, increase in size of a light irradiation device, a short life of a lamp, and the like. Therefore, recently a low energy light emitting diode has been used.

Further, Japanese Patent Document No. 2011-057744 discloses an ultraviolet light-curable clear ink composition for ink jet printing comprising a polymerization inhibitor such as a hindered amine compound or a nitrosamine compound, and a polymerization initiator such as acylphosphine oxide compound as a conventional ultraviolet light-curable clear ink composition for ink jet printing. Furthermore, Japanese Patent Document No. 2013-503931 discloses an ultraviolet light-curable clear ink composition for ink jet printing comprising at least 30% by mass of a mono-functional acrylate monomer and at least 3% by mass of a photo initiator based on a total mass of the ink, wherein the photo initiator comprises an α-hydroxyketone photo-polymerization initiator and 0 to 6% by mass of an acyl-phosphine photo-polymerization initiator based on a total mass of the ink.

SUMMARY

However, with respect to the ultraviolet light-curable clear ink composition for ink jet printing described in Japanese Patent Document No. 2011-057744, there is neither disclosure nor suggestion regarding curing (UV-LED curability) with ultraviolet light using a light emitting diode as a light source. Further all of the poly-functional monomer contents in Examples exceed 50% by mass. Therefore, the cured coating film obtained by curing the clear ink composition of Japanese Patent Document No. 2011-0557744 has inferior adhesion to a substrate. Further, in the ultraviolet light-curable clear ink composition for ink jet printing described in Japanese Patent Document No. 2013-503931, the content of acylphosphine photo initiator is only 0 to 6% by mass based on a total mass of the ink. Therefore, the ultraviolet light-curable clear ink composition for ink jet printing described in Japanese Patent Document No. 2013-503931 is insufficient in UV-LED curability.

The presently disclosed embodiment was made in the light of the above-mentioned conventional problems, and an object of the presently disclosed embodiment is to provide an UV-LED curable clear ink composition for ink jet printing, which is excellent in UV-LED curability, ejection stability, and adhesion to a substrate and scratch resistance of an obtained cured coating film, and assures that yellowing of the cured coating film is hardly generated.

The inventors of the presently disclosed embodiment have made intensive studies to solve the above-mentioned problems, and as a result, have found that all of the above-mentioned problems can be solved in the case of an UV-LED curable clear ink composition for ink jet printing comprising to 80% by mass of a photo-polymerizable mono-functional monomer, 15 to 50% by mass of a photo-polymerizable poly-functional monomer and 5 to 15% by mass of an acylphosphine photo-polymerization initiator, wherein the photo-polymerizable mono-functional monomer and the photo-polymerizable poly-functional monomer comprise a photo-polymerizable monomer having at least one of functional groups including an amide group and an amino group, and the photo-polymerizable monomer is contained in an amount of 5 to 20% by mass based on the total amount of photo-polymerizable mono-functional monomer and photo-polymerizable poly-functional monomer. Thus, the presently disclosed embodiment has been completed.

Namely, the UV-LED curable clear ink composition for ink jet printing of one aspect of the presently disclosed embodiment for solving the above-mentioned problem is an UV-LED curable clear ink composition for ink jet printing comprising 44 to 80% by mass of a photo-polymerizable mono-functional monomer, 15 to 50% by mass of a photo-polymerizable poly-functional monomer and 5 to 15% by mass of an acylphosphine photo-polymerization initiator, and having a viscosity at 25° C. of 1 to 50 mPa·s, wherein the photo-polymerizable mono-functional monomer and the photo-polymerizable poly-functional monomer comprise a photo-polymerizable monomer having at least one of functional groups including an amide group and an amino group, and the photo-polymerizable monomer is contained in an amount of 5 to 20% by mass based on the total amount of photo-polymerizable mono-functional monomer and photo-polymerizable poly-functional monomer.

DETAILED DESCRIPTION

[UV-LED Curable Clear Ink Composition for Ink Jet Printing]

The UV-LED curable clear ink composition for ink jet printing of one aspect of the presently disclosed embodiment is explained below in detail. The UV-LED curable clear ink composition for ink jet printing of this aspect (hereinafter also referred to simply as a clear ink composition) comprises specific amounts of photo-polymerizable mono-functional monomer, photo-polymerizable poly-functional monomer and acylphosphine photo-polymerization initiator. Further, the photo-polymerizable mono-functional monomer and the photo-polymerizable poly-functional monomer comprise a photo-polymerizable monomer having at least one of functional groups including an amide group and an amino group (hereinafter also referred to simply as a photo-polymerizable monomer), and the photo-polymerizable monomer is contained in a specific amount based on the total amount of photo-polymerizable mono-functional monomer and photo-polymerizable poly-functional monomer. The respective configurations are explained below. In addition, in the following explanation, UV-LED (namely ultraviolet light (UV) from a light emitting diode (LED) as a light source) means "light emitted from a light emitting diode emitting ultraviolet light having an emitted light peek wavelength within a range of 350 to 420 nm".

<Photo-Polymerizable Mono-Functional Monomer>

Examples of the photo-polymerizable mono-functional monomer include alkyl (meth)acrylates such as methyl methacrylate, butyl methacrylate, 2-ethylhexyl methacrylate, methyl acrylate, butyl acrylate and 2-ethylhexyl acrylate; alicyclic mono-functional monomers such as isobornyl (meth)acrylate, phenoxyethyl (meth)acrylate, t-4-butylcyclohexyl (meth)acrylate, dicyclopentenyl (meth)acrylate and cyclohexyl (meth)acrylate; aralkyl (meth)acrylate such as benzyl methacrylate; alkoxyalkyl (meth)acrylates such as butoxyethyl methacrylate and butoxyethyl acrylate; (meth)acrylic esters of polyalkylene glycol monoalkyl ether such as triethylene glycol monobutyl ether and dipropylene glycol monomethyl ether; (meth)acrylic esters of polyalkylene glycol monoaryl ether such as hexamethylene glycol monophenyl ether; photo-polymerizable monomers such as glycerol (meth)acrylate and 2-hydroxyethyl (meth)acrylate; photo-polymerizable oligomers such as epoxy (meth)acrylate, polyester (meth)acrylate and polyether (meth)acrylate; photo-polymerizable mono-functional monomers having an amide group and/or an amino group such as (meth)acryloyl morpholine, N-vinylcaprolactam and N-vinylpyrolidone; and the like. These photo-polymerizable mono-functional monomers may be used in combination.

Among these photo-polymerizable mono-functional monomers, alicyclic mono-functional monomers are preferable from the viewpoint of excellent tackiness of an obtained cured coating film. Examples of the alicyclic mono-functional monomers include isobornyl (meth)acrylate, phenoxyethyl (meth) acrylate, t-4-butylcyclohexyl (meth) acrylate, dicyclopentenyl (meth)acrylate and cyclohexyl (meth)acrylate. Among these alicyclic monomers, isobornyl (meth)acrylate, phenoxyethyl (meth)acrylate, t-4-butylcyclohexyl (meth)acrylate and dicyclopentenyl (meth)acrylate are preferable from the viewpoint of excellent tackiness of an obtained cured coating film, and isobornyl (meth)acrylate is more preferable. These alicyclic mono-functional monomers may be used in combination.

A content of photo-polymerizable mono-functional monomers may be not less than 44% by mass in the clear ink composition, and not less than 50% by mass is preferable. Further the content of photo-polymerizable mono-functional monomers may be not more than 80% by mass in the clear ink composition, and not more than 75% by mass is preferable. Furthermore, it is more preferable that the photo-polymerizable mono-functional monomer is an alicyclic mono-functional monomer and its content is from 50 to 75% by mass. When the content of photo-polymerizable mono-functional monomer is less than 44% by mass, adhesion of an obtained cured coating film is likely to deteriorate. Meanwhile, when the content of photo-polymerizable mono-functional monomer exceeds 80% by mass, tackiness and scratch resistance of an obtained cured coating film are likely to deteriorate.

<Photo-Polymerizable Poly-Functional Monomer>

Examples of the photo-polymerizable poly-functional monomer include acrylated amine compounds having two photo-polymerizable functional groups and two amino groups in a molecule thereof, vinyloxyethoxyethyl (meth)acrylate, 1,4-butanediol di(meth)acrylate, 1,6-hexanediol di(meth)acrylate, ethylene glycol di(meth)acrylate, diethylene glycol di(meth)acrylate, triethylene glycol di(meth)acrylate, tetraethylene glycol di(meth)acrylate, polyethylene glycol di(meth)acrylate, neopentyl glycol di(meth)acrylate, propylene glycol di(meth)acrylate, dipropylene glycol di(meth)acrylate, tripropylene glycol di(meth)acrylate, ethoxylated 1,6-hexanediol di(meth)acrylate, ethoxylated neopentyl glycol di(meth)acrylate, ethoxylated bisphenol A di(meth)acrylate, cyclohexanedimethanol di(meth)acrylate, alkoxylated hexanediol di(meth)acrylate, alkoxylated cyclohexanedimethanol di(meth)acrylate, alkoxylated di(meth)acrylate, tricyclodecanedimethanol di(meth)acrylate, propoxylated neopentyl glycol di(meth)acrylate, alkoxylated neopentyl glycol di(meth)acrylate, alkoxylated aliphatic di(meth)acrylate, trimethylolpropane tri(meth)acrylate, tris(2-hydroxyethyl)isocyanurate tri(meth)acrylate, pentaerythritol tri(meth)acrylate, ethoxylated trimethylolpropane tri(meth)acrylate, propoxylated trimethylolpropane tri(meth)acrylate, propoxylated glyceryl tri(meth)acrylate, pentaerythritol tetra(meth)acrylate, ditrimethylolpropane tetra(meth)acrylate, ethoxylated pentaerythritol tetra(meth)acrylate, dipentaerythritol penta(meth)acrylate, and the like. These photo-polymerizable poly-functional monomers may be used in combination.

Among these photo-polymerizable poly-functional monomers, acrylated amine compounds having two photo-polymerizable functional groups and two amino groups in a molecule thereof are preferable from the viewpoint of excellent scratch resistance, tackiness and adhesion to a substrate of an obtained cured coating film.

Examples of the acrylated amine compounds having two photo-polymerizable functional groups and two amino groups in a molecule thereof include compounds obtained by a reaction of a bifunctional (meth)acrylate and an amine compound.

Examples of the bifunctional (meth)acrylates include alkylene glycol di(meth)acrylates such as 1,4-butanediol di(meth)acrylate, 1,6-hexanediol di(meth)acrylate, 1,9-nonanediol di(meth)acrylate, propylene glycol di(meth)acrylate, 1,3-butylene glycol di(meth)acrylate and neopentyl glycol di(meth)acrylate; bisphenol-alkylene oxide adduct di(meth)acrylates such as bisphenol A ethylene oxide adduct di(meth)acrylate, bisphenol F ethylene oxide adduct di(meth)acrylate, bisphenol S ethylene oxide adduct di(meth)acrylate, thiobisphenol ethylene oxide adduct di(meth)acrylate and brominated bisphenol A ethylene oxide adduct di(meth)acrylate; polyalkylene glycol di(meth)acrylates such as polyethylene glycol di(meth)acrylate and polypropylene glycol di(meth)acrylate; neopentylglycol hydroxypivalate di(meth)acrylate; and the like. Among these, 1,6-hexane di(meth)acrylate is preferable.

Examples of the amine compound include mono-functional amine compounds such as benzylamine, phenetylamine, ethylamine, n-propylamine, isopropylamine, n-butylamine, isobutylamine, n-pentylamine, isopentylamine, n-hexylamine, cyclohexylamine, n-heptylamine, n-octylamine, 2-ethylhexylamine, n-nonylamine, n-decylamine, n-dodecylamine, n-tetradecylamine, n-hexadecylamine and n-octadecylamine; and poly-functional amine compounds such as diethylenetriamine, triethylenetetramine, tetraethylenepentamine, 1,6-hexamethylenediamine, 1,8-octamethylenediamine, 1,12-dodecamethylenediamine, o-phenylenediamine, p-phenylenediamine, m-phenylenediamine, o-xylylenediamine, p-xylylenediamine, m-xylylenediamine, menthenediamine, bis(4-amino-3-methylcyclohexyl)methane, isophoronediamine, 1,3-diaminocyclohexane and spiroacetal diamine. Further there are exemplified high molecular weight poly-functional amine compounds such as polyethyleneimine, polyvinylamine and polyallylamine.

Among these, a compound obtained by a reaction of 1,6-hexane di(meth)acrylate and an amine compound can be suitably used as the acrylated amine compounds having two photo-polymerizable functional groups and two amino groups in a molecule thereof. Specific examples thereof include CN371 (available from Sartomer Japan Inc.), EB-7100 (EBECRYL 7100 available from Daicel Cytec Co., Ltd.), and the like.

A content of the photo-polymerizable poly-functional monomer may be not less than 15% by mass in the clear ink composition, and not less than 20% by mass is preferable. Further the content of the photo-polymerizable poly-functional monomer may be not more than 50% by mass in the clear ink composition, and not more than 35% by mass is preferable. When the content of the photo-polymerizable poly-functional monomer is less than 15% by mass, scratch resistance and tackiness of an obtained cured coating film are likely to deteriorate. Meanwhile, when the content of photo-polymerizable poly-functional monomer exceeds 50% by mass, adhesion of an obtained cured coating film is likely to deteriorate.

<Photo Polymerizable Monomer Having at Least One of an Amide Group and an Amino Group>

In the clear ink composition of this aspect, the photo-polymerizable monomer having at least one of an amide group and an amino group (hereinafter also referred to simply as the photo-polymerizable monomer) is included in the above-mentioned photo-polymerizable mono-functional monomer and photo-polymerizable poly-functional monomer.

Examples of the photo-polymerizable monomer having an amide group include acrylamide, methacrylamide, diethylacrylamide, N,N-dimethylacrylamide, N,N-dimethylmethacrylamide, N,N-diethylacrylamide, N,N-diethylmethacrylamide, N,N'-methylenebisacrylamide, N,N-dimethylaminopropyl acrylamide, N,N-dimethylaminopropyl methacrylamide, diacetone acrylamide, acryloyl morpholine, and the like.

Examples of the photo-polymerizable monomer having an amino group include aminoethyl (meth)acrylate, N,N-dimethylaminoethyl (meth) acrylate, N,N-dimethylaminopropyl (meth)acrylate, and the like.

Examples of other photo-polymerizable monomers include (meth)acryloyl morpholine, N-vinylcaprolactam, N-vinylpyrolidone, and the like which are exemplified above as the photo-polymerizable mono-functional monomers, the above-mentioned acrylated amine compounds having two photo-polymerizable functional groups and two amino groups in a molecule thereof and exemplified above as the photo-polymerizable poly-functional monomers, and the like. Among these, the acrylated amine compounds having two photo-polymerizable functional groups and two amino groups in a molecule thereof are preferable as the photo-polymerizable monomer from the viewpoint of satisfactory UV-LED curability of the clear ink composition and excellent adhesion to a substrate and scratch resistance of an obtained cured coating film. These photo-polymerizable monomers may be used in combination.

A content of the photo-polymerizable monomer may be not less than 5% by mass based on the total amount of the above-mentioned photo-polymerizable mono-functional monomer and photo-polymerizable poly-functional monomer, and not less than 7% by mass is preferable. Further the content of the photo-polymerizable monomer may be not more than 20% by mass based on the total amount of the above-mentioned photo-polymerizable mono-functional monomer and photo-polymerizable poly-functional monomer, and not more than 15% by mass is preferable. When the content of the photo-polymerizable monomer is less than 5% by mass, UV-LED curability of the clear ink composition is likely to deteriorate. Meanwhile, when the content of the photo-polymerizable monomer exceeds 20% by mass, an obtained cured coating film is subject to yellowing to an extent such that the film cannot be used as a product.

<Acylphosphine Photo-Polymerization Initiator>

The acylphosphine photo-polymerization initiator is a photo-polymerization initiator having an acylphosphine group. The acylphosphine photo-polymerization initiator has light absorption characteristic over a total wavelength range of 450 to 300 nm, and when receiving irradiation of light (UV-LED) having this specific wavelength, allows the clear ink composition to be polymerized to be a polymer.

Examples of the acylphosphine photo-polymerization initiator include 2,4,6-trimethylbenzoyl diphenylphosphine oxide, 2,6-dimethoxybenzoyl diphenylphosphine oxide, 2,6-dichlorobenzoyl diphenylphosphine oxide, 2,3,5,6-tetramethylbenzoyl diphenylphosphine oxide, 2,6-dimethylbenzoyl dimethylphosphine oxide, 4-methylbenzoyl diphenylphosphine oxide, 4-ethylbenzoyl diphenylphosphine oxide, 4-isopropylbenzoyl diphenylphosphine oxide, 1-methylcyclohexanoylbenzoyl diphenylphosphine oxide, bis(2,4,6-trimethylbenzoyl)-phenylphosphine oxide, 2,4,6-trimethylbenzoylphenylphosphinic acid methyl ester, 2,4,6-trimethylbenzoylphenylphosphinic acid isopropyl ester, bis(2,6-dimethoxybenzoyl)-2,4,4-trimethylpentylphosphine oxide, bis(2,6-dimethoxybenzoyl)-2,3,3-trimethyl-pentylphosphine oxide, and the like. Specifically an example of 2,4,6-trimethylbenzoyl diphenylphosphine oxide includes TPO (available from Lamberti S.p.A.), and examples of bis(2,4,6-trimethylbenzoyl)-phenylphosphine oxide include IRGACURE 819 (available from Ciba Specialty Chemicals Co., Ltd.), and the like. These acylphosphine photo-polymerization initiators may be used in combination.

A content of acylphosphine photo-polymerization initiators may be not less than 5% by mass in the clear ink composition, and not less than 6% by mass is preferable. Further the content of acylphosphine photo-polymerization initiators may be not more than 15% by mass in the clear ink composition, and not more than 12% by mass is preferable. When the content of acylphosphine photo-polymerization initiators is less than 5% by mass, UV-LED curability of the clear ink composition is likely to deteriorate. Meanwhile, when the content of acylphosphine photo-polymerization initiators exceeds 15% by mass, an effect of compounding the acylphosphine photo-polymerization initiators to the clear ink composition is not enhanced, which results in excessive addition thereof.

In the clear ink composition of this aspect, the acylphosphine photo-polymerization initiators may be compounded in an amount of 5 to 15% by mass, and other photo-polymerization initiators may be used together within a range not to lower performances thereof. Examples of other photo-polymerization initiators include thioxanthone photo-polymerization initiators, α-hydroxyketone photo-polymerization initiators, triazine photo-polymerization initiators, and the like.

The clear ink composition of this aspect can be prepared by well-known processes. One example thereof is such that the clear ink composition can be prepared, for example, by mixing and stirring all of the above-mentioned components and optional components explained later. A viscosity at 25° C. of an obtained clear ink composition is adjusted to 1 mPa·s or more. Further the viscosity at 25° C. of the clear ink composition is adjusted to 50 mPa·s or less, and is preferably adjusted to 30 mPa·s or less. The clear ink composition is excellent in ejection stability at the time of printing by an ink jet recording apparatus. Particularly the clear ink composition is excellent in ejection stability at room temperature when ejected from a head of an ink jet recording apparatus designed for a low viscosity ink for the purposes of energy saving, high speed and high definition.

Further the clear ink composition of this aspect can be subjected to printing and curing by well-known methods. One example thereof is such that the clear ink composition can be subjected to printing and curing by ejecting onto a substrate or a printed matter, namely a printed substrate (hereinafter referred to simply as a substrate or the like) and thereafter exposing for curing of a coating film of the clear ink composition deposited on the substrate by means of UV-LED.

Substrates which have been used for UV-LED curable clear ink compositions for ink jet printing can be used as the substrate without particular limitation. Specific examples of the substrate include paper, plastic film, capsule, metal foil, glass, and the like. Among these, floor materials, vinyl chloride, polycarbonate, and the like are preferable as the substrate.

For example, the clear ink composition of this aspect is fed to a printer head of an ink jet recording apparatus (ink jet printer) for a low viscosity ink, and is ejected onto a substrate from the printer head. The ejected clear ink composition is deposited onto the substrate so that a coating film thickness is, for example 1 to 60 μm. The deposited clear ink composition is appropriately cured by irradiation of UV-LED. In addition, well-known ink jet recording apparatuses are used as the ink jet recording apparatus for printing of the clear ink composition of this aspect. In this case, when a continuous type ink jet recording apparatus is used, it is preferable to add an electrical conductivity imparting agent to the clear ink composition for properly adjusting an electric conductance.

<Optional Components for Clear Ink Composition>

Next, optional components to be suitably compounded in the clear ink composition of this aspect are explained. To the clear ink composition of this aspect may be compounded optional components in addition to the above-mentioned components in order to exhibit various functions. The clear ink composition may comprise, for example, a surfactant, a solvent, a pigment, a pigment dispersant and various additives.

(Surfactant)

A surfactant may be compounded appropriately in order to enhance ejection stability of the clear ink composition depending on the head of the ink jet recording apparatus for the clear ink composition. Examples of the surfactant include silicone surfactants, and the like which have been used suitably for a photo-curable ink composition for ink jet printing. Specifically examples of the silicone surfactants include polyether-modified silicone oil, polyester-modified polydimethylsiloxane, polyester-modified methyl alkyl polysiloxane, and the like. These surfactants may be used together.

A content of surfactant is preferably not less than 0.005% by mass in the clear ink composition. Further the content of surfactant is preferably not more than 1.0% by mass in the clear ink composition. When the content of surfactant is less than 0.005% by mass, a surface tension of the clear ink composition is high and ejection stability is likely to deteriorate. Meanwhile, when the content of surfactant exceeds 1.0% by mass, the clear ink composition is prone to have bubbles, and ejection stability is likely to deteriorate.

(Solvent)

A solvent may be appropriately compounded to the clear ink composition. Examples of the solvent include ester-based organic solvents, ether-based organic solvents, ether-ester-based organic solvents, ketone-based organic solvents, aromatic hydrocarbon solvents, nitrogen-containing organic solvents, and the like. Further there are exemplified, as the solvent, those having a boiling point of from 150° C. to 220° C. at a normal pressure ($1.013 \times 10^2$ kPa).

From the viewpoint of curability of the clear ink composition, environmental problem, and the like, it is preferable that an organic solvent is not used as far as possible. Therefore, the content of the organic solvent is preferably not more than 5% by mass in the clear ink composition, more preferably not more than 2% by mass, and no use thereof is further preferable.

(Pigment)

A pigment may be appropriately compounded to obtain clear ink compositions of various colors. Pigments which have been used usually for photo-curable ink compositions for ink jet printing can be used particularly without any limitation. Specifically preferable are organic pigments and inorganic pigments which are dispersed satisfactorily in the clear ink composition and have good weather resistance. Specific examples of the organic solvents include dye-laked pigments, and azo, benzimidazolone, phthalocyanine, quinacridone, anthraquinone, dioxazine, indigo, thioindigo, perylene, perynone, diketopyrrolopyrrole, isoindolinone, nitro, anthraquinone, flavanthrone, quinophthalone, pyranthrone and indanthrone pigments, and the like. These pigments may be used together.

(Pigment Dispersant)

A pigment dispersant may be compounded for enhancing dispersion of a pigment. Pigment dispersants which have been used usually for photo-curable ink compositions for ink jet printing can be used particularly without any limitation. Among those which have been used so far, high molecular weight dispersants are used suitably as the pigment dispersant. Examples of the high molecular dispersants include carbodiimide dispersants, polyester amine dispersants, aliphatic amine dispersants, modified polyacrylate dispersants, modified polyurethane dispersants, multi-branched high molecular weight nonionic dispersants, high molecular weight ion activators, and the like. These pigment dispersants may be used together.

(Various Additives)

A thermosetting resin, a light stabilizer, a surface treating agent, a viscosity reducing agent, an antioxidant, an age resistor, a crosslinking agent, a polymerization inhibitor, a sensitizer, a plasticizer, an antiseptic agent, a pH regulator, an anti-foaming agent, a humectant, and the like may be appropriately compounded as the various additives.

As mentioned above, the clear ink composition of this embodiment comprises 44 to 80% by mass of the photo-polymerizable mono-functional monomer, 15 to 50% by mass of the photo-polymerizable poly-functional monomer and 5 to 15% by mass of the acylphosphine photo-polymerization initiator. This clear ink composition is excellent in UV-LED curability. Further the obtained cured coating film has good adhesion to a substrate and scratch resistance. Furthermore, the photo-polymerizable mono-functional monomer and the photo-polymerizable poly-functional monomer comprise the photo-polymerizable monomer having at least one of functional groups including an amide group and an amino group, and the photo-polymerizable monomer is contained in an amount of 5 to 20% by mass based on the total amount of photo-polymerizable mono-functional monomer and photo-polymerizable poly-functional monomer. In this clear ink composition, yellowing is hardly generated on the obtained cured coating film. Further, a viscosity at 25° C. of the clear ink composition of this embodiment is 1 to 50 mPa·s. Therefore, ejection stability when printing with the ink jet recording apparatus is excellent.

One aspect of the presently disclosed embodiment is as explained above. The presently disclosed embodiment is not limited to the UV-LED curable clear ink composition for ink jet printing as described in the above-mentioned aspect. In the above-mentioned aspect, the presently disclosed embodiment comprising the following configurations is described.

(1) UV-LED curable clear ink composition for ink jet printing comprising 44 to 80% by mass of the photo-polymerizable mono-functional monomer, 15 to 50% by mass of the photo-polymerizable poly-functional monomer and 5 to 15% by mass of the acylphosphine photo-polymerization initiator and having a viscosity at 25° C. of 1 to 50 mPa·s, wherein the photo-polymerizable mono-functional monomer and the photo-polymerizable poly-functional monomer comprise a photo-polymerizable monomer having at least one of functional groups including an amide group and an amino group, and the photo-polymerizable monomer is contained in an amount of 5 to 20% by mass based on the total amount of photo-polymerizable mono-functional monomer and photo-polymerizable poly-functional monomer.

According to this configuration, the UV-LED curable clear ink composition for ink jet printing comprises 44 to 80% by mass of the photo-polymerizable mono-functional monomer, 15 to 50% by mass of the photo-polymerizable poly-functional monomer and 5 to 15% by mass of the acylphosphine photo-polymerization initiator. This UV-LED curable clear ink composition for ink jet printing of the presently disclosed embodiment is excellent in UV-LED curability. Further, the obtained cured coating film is excellent in adhesion to a substrate and scratch resistance. Furthermore, the photo-polymerizable mono-functional monomer and the photo-polymerizable poly-functional monomer comprise the photo-polymerizable monomer having at least one of functional groups including an amide group and an amino group, and the photo-polymerizable monomer is contained in an amount of 5 to 20% by mass based on the total amount of photo-polymerizable mono-functional monomer and photo-polymerizable poly-functional monomer. In this UV-LED curable clear ink composition for ink jet printing of the presently disclosed embodiment, the obtained cured coating film is hardly subject to yellowing. Further the UV-LED curable clear ink composition for ink jet printing of the presently disclosed embodiment has a viscosity at 25° C. of 1 to 50 mPa·s. This UV-LED curable clear ink composition for ink jet printing of the presently disclosed embodiment is excellent in ejection stability when ejected from the ink jet recording apparatus.

(2) UV-LED curable clear ink composition for ink jet printing of the above (1), wherein the photo-polymerizable mono-functional monomer is an alicyclic mono-functional monomer.

According to this configuration, the cured coating film obtained from the UV-LED curable clear ink composition for ink jet printing is excellent in tackiness.

(3) UV-LED curable clear ink composition for ink jet printing of the above (2), wherein the alicyclic mono-functional monomer is at least any one selected from the group consisting of isobornyl (meth)acrylate, phenoxy (meth)acrylate, t-4-butylcyclohexyl (meth)acrylate and dicyclopentenyl (meth) acrylate.

According to this configuration, the cured coating film obtained from the UV-LED curable clear ink composition for ink jet printing is further excellent in tackiness.

(4) UV-LED curable clear ink composition for ink jet printing of any one of the above (1) to (3), wherein the photo-polymerizable monomer is an acrylated amine compound having two photo-polymerizable functional groups and two amino groups in a molecule thereof.

According to this configuration, the cured coating film obtained from the UV-LED curable clear ink composition for ink jet printing is further excellent in UV-LED curability. Further the obtained cured coating film is further excellent in adhesion to a substrate and scratch resistance.

EXAMPLE

The presently disclosed embodiment is explained below specifically by means of Examples. The presently disclosed embodiment is not limited to these Examples. In addition, "%" means "% by mass" and "part" means "part by mass" unless restricted otherwise.

Materials used are described below.
<Photo-Polymerizable Compound>
IBXA: Isobornyl acrylate
HDDA: Hexanediol diacrylate
PEA: Phenoxyethyl (meth)acrylate
t-4-Butylcyclohexyl (meth)acrylate
CN371: Acrylated amine compounds having two methacryloyl groups and two amino groups in a molecule thereof (available from Sartomer Japan Inc.)
VCAP: N-vinylcaprolactam
<Photo-Polymerization Initiator>
TPO: 2,4,6-Trimethylbenzoyl diphenylphosphine oxide
<Surfactant>
BYK-315 (Silicone surfactant, available from BYK-Chemie GmbH)
<Polymerization Inhibitor>
UV-5 (available from Kromachem Ltd.)

Examples 1 to 8 and Comparative examples 1 to 5 Each of components was stirred and mixed to obtain a compounding formulation (% by mass) shown in Table 1, and thus, clear ink compositions of Examples 1 to 8 and Comparative examples 1 to 5 were prepared.

Viscosities of the clear ink compositions of Examples 1 to 8 and Comparative examples 1 to 5 were measured in accordance with the following evaluation methods. Each of the clear ink compositions obtained in Examples 1 to 8 and Comparative examples 1 to 5 was applied to a substrate (PVC 80 (available from LINTEC CORPORATION)) with a #4 bar coater, and then cured using a UV-LED light lamp (available from Phoseon Technology Japan). UV-LED curability, ejection stability, and adhesion to a substrate, scratch resistance and a degree of yellowing of obtained cured coating films were evaluated by the following evaluation methods. The results are shown in Tables 1 and 2.

1. Viscosity of Clear Ink Composition

Viscosities of the clear ink compositions were measured under the conditions of a temperature of 25° C. and a rotor rotation speed of 50 rpm by using an E-type viscometer (RE100L type viscometer available from TOKI SANGYO CO., LTD.)
(Evaluation Criteria)
⊚: A viscosity at 25° C. was 1 to 30 mPa·s.
○: A viscosity at 25° C. was more than 31 mPa·s and not more than 50 mPa·s.
x: A viscosity at 25° C. was more than 50 mPa·s.

2. UV-LED Curability

The clear ink composition was applied to a substrate (PVC 80 (available from LINTEC CORPORATION)) with a #4 bar coater, and then UV-LED light was irradiated with the UV-LED light lamp (available from Phoseon Technology Japan) at a distance of 2 cm apart from a surface of a coating film of the clear ink composition so that an integrated quantity of UV light in one irradiation per second was 60 mJ/cm$^2$, and an integrated quantity (time) of irradiation energy until tackiness on the surface of the coating film disappeared was measured.
(Evaluation Criteria)
⊚: The coated clear ink composition was cured within a second.
○: The coated clear ink composition was cured within a period of time of more than one second and not more than three seconds.
x: The coated clear ink composition was not cured within three seconds.

3. Adhesion

The clear ink composition was applied to a substrate (PVC 80 (available from LINTEC CORPORATION)) with a #4 bar coater, and then was cured with the UV-LED light lamp (available from Phoseon Technology Japan) until tackiness on a surface of the coated clear ink composition disappeared. The obtained cured coating film was cross-cut with a cutter knife, a cellophane tape was stuck on the cut portions, and then by peeling off the cellophane tape, the peeling of the cured coating film was evaluated by the following criteria.
(Evaluation Criteria)
○: The cured coating film was not peeled off, or while there was peeling, a peeled area was less than 20%.
x: A peeled area of the cured coating film was 20% or more.

4. Scratch Resistance

The clear ink composition was applied to a substrate (PVC 80 (available from LINTEC CORPORATION)) with a #4 bar coater, and then the coated clear ink composition was cured with the UV-LED light lamp (available from Phoseon Technology Japan). Then the cured coating film was subjected to rubbing using a bleached cloth 100 times at a pressure of 500 g with a Gakushin-type rubbing tester (available from DAIEI KAGAKU SEIKI MFG. CO., LTD., and removal of the coating film was observed with naked eyes and was evaluated by the following criteria.
(Evaluation Criteria)
○: The coating film was not removed, or there was a scar on the surface of the coating film.
x: The coating film was removed, and the substrate was seen.

5. Ejection Stability

An ink jet recording apparatus having an ink jet nozzle and a clear ink composition were left for 24 hours in a space wherein an atmosphere temperature was 25° C., to set the temperatures of the ink jet recording apparatus and the clear ink composition to 25° C. Thereafter, printing of the clear ink composition was conducted continuously on a substrate (PVC 80 (available from LINTEC CORPORATION)) under an atmosphere temperature of 25° C., and ejection stability was evaluated in accordance with the following evaluation criteria.
(Evaluation Criteria)
○: There was no printing turbulence and the ink could be ejected stably.
x: There was a printing turbulence, or the ink could not be ejected stably.

6. Degree of Yellowing

The clear ink composition was applied to a substrate (PVC 80 (available from LINTEC CORPORATION)) with a #4 bar coater, and then the coated clear ink composition was cured with the UV-LED light lamp (available from Phoseon Technology Japan) until tackiness on the surface of the coated clear ink composition disappeared. The obtained cured coating film was observed with naked eyes to evaluate a degree of yellowing in accordance with the following evaluation criteria.
(Evaluation Criteria)
○: There was no remarkable difference in color from whiteness of the substrate. x: The coated clear ink composition looked yellowish as compared with whiteness of the substrate.

TABLE 1

| | Examples | | | | | | | |
|---|---|---|---|---|---|---|---|---|
| | 1 | 2 | 3 | 4 | 5 | 6 | 7 | 8 |
| CN371 (photo-polymerizable poly-functional monomer, photo-polymerizable monomer) | 10 | 10 | 10 | 6 | 15 | 10 | 10 | 10 |
| VCAP (photo-polymerizable mono-functional monomer, photo-polymerizable monomer) | 0 | 0 | 0 | 0 | 1 | 0 | 0 | 0 |
| IBXA (photo-polymerizable mono-functional monomer) | 63 | 50 | 72 | 63 | 62 | 0 | 0 | 59 |
| PEA (photo-polymerizable mono-functional monomer) | 0 | 0 | 0 | 0 | 0 | 63 | 0 | 0 |
| t-4-Butylcyclohexyl acrylate (photo-polymerizable mono-functional monomer) | 0 | 0 | 0 | 0 | 0 | 0 | 63 | 0 |
| HDDA (photo-polymerizable poly-functional monomer) | 15.5 | 28.5 | 6.5 | 19.5 | 10.5 | 15.5 | 15.5 | 15.5 |
| TPO | 10 | 10 | 10 | 10 | 10 | 10 | 10 | 14 |
| BYK-331 | 0.5 | 0.5 | 0.5 | 0.5 | 0.5 | 0.5 | 0.5 | 0.5 |
| UV-5 | 1 | 1 | 1 | 1 | 1 | 1 | 1 | 1 |
| Total | 100 | 100 | 100 | 100 | 100 | 100 | 100 | 100 |
| Proportion of photo-polymerizable monomer to the total amount of photo-polymerizable mono-functional monomer and photo-polymerizable poly-functional monomer (%) | 11.3 | 11.3 | 11.3 | 6.8 | 18.1 | 11.3 | 11.3 | 11.8 |
| Results of evaluation | | | | | | | | |
| Viscosity (25° C.) | ◎ | ◎ | ◎ | ◎ | ◎ | ◎ | ◎ | ◎ |
| UV-LED curability | ○ | ○ | ○ | ○ | ◎ | ○ | ○ | ◎ |
| Adhesion | ○ | ○ | ○ | ○ | ○ | ○ | ○ | ○ |
| Scratch resistance | ○ | ○ | ○ | ○ | ○ | ○ | ○ | ○ |
| Ejection stability | ○ | ○ | ○ | ○ | ○ | ○ | ○ | ○ |
| Degree of yellowing | ○ | ○ | ○ | ○ | ○ | ○ | ○ | ○ |

TABLE 2

| | Comparative Examples | | | | |
|---|---|---|---|---|---|
| | 1 | 2 | 3 | 4 | 5 |
| CN371 (photo-polymerizable poly-functional monomer, photo-polymerizable monomer) | 10 | 10 | 6.5 | 4 | 25.5 |
| VCAP (photo-polymerizable mono-functional monomer, photo-polymerizable monomer) | 0 | 0 | 0 | 0 | 15 |
| IBXA (photo-polymerizable mono-functional monomer) | 33 | 69 | 85 | 69 | 48 |
| PEA (photo-polymerizable mono-functional monomer) | 0 | 0 | 0 | 0 | 0 |
| t-4-Butylcyclohexyl acrylate (photo-polymerizable mono-functional monomer) | 0 | 0 | 0 | 0 | 0 |
| HDDA (photo-polymerizable poly-functional monomer) | 45.5 | 15.5 | 0 | 15.5 | 0 |
| TPO | 10 | 4 | 7 | 10 | 10 |
| BYK-331 | 0.5 | 0.5 | 0.5 | 0.5 | 0.5 |
| UV-5 | 1 | 1 | 1 | 1 | 1 |
| Total | 100 | 100 | 100 | 100 | 100 |
| Proportion of photo-polymerizable monomer to the total amount of photo-polymerizable mono-functional monomer and photo-polymerizable poly-functional monomer (%) | 11.3 | 10.6 | 7.1 | 4.5 | 45.8 |
| Results of evaluation | | | | | |
| Viscosity (25° C.) | ◎ | ◎ | ◎ | ◎ | ○ |
| UV-LED curability | ○ | × | ○ | × | ○ |
| Adhesion | × | ○ | ○ | ○ | ○ |
| Scratch resistance | ○ | ○ | × | ○ | ○ |
| Ejection stability | ○ | ○ | ○ | ○ | × |
| Degree of yellowing | ○ | ○ | ○ | ○ | × |

As shown in Table 1, with respect to the clear ink compositions of Examples 1 to 8, the results of the UV-LED curability and the ejection stability were satisfactory. Further with respect to the cured coating films made using the clear ink compositions of Examples 1 to 8, the results of the adhesion to the substrate, the scratch resistance and the degree of yellowing were good.

Meanwhile, as shown in Table 2, in the cured coating film made using the clear ink composition of Comparative example 1 having a large content of the photo-polymerizable poly-functional monomer, the adhesion to the substrate was not good. In the clear ink composition having a small content of the acylphosphine photo-polymerization initiator and made in Comparative example 2, the UV-LED curability was not good. In the cured coating film made using the clear ink composition of Comparative example 3 having a large content of the photo-polymerizable mono-functional monomer, the scratch resistance was not good. In the clear ink composition having a small content of the photo-polymerizable monomer and made in Comparative example 4, the UV-LED curability was not good. In the clear ink composition having a large content of the photo-polymerizable monomer and made in Comparative example 5, the viscosity was high, the ejection stability was not good, and yellowing of the cured coating film made using this clear ink composition was remarkable.

What is claimed is:
1. An UV-LED curable clear ink composition for ink jet printing comprising:
50 to 80% by mass of a photo-polymerizable mono-functional monomer, wherein the photo-polymerizable mono-functional monomer includes an alicyclic mono-functional monomer, wherein the alicyclic mono-functional monomer is at least one selected from the group consisting of isobornyl (meth)acrylate, t-4-butylcyclohexyl (meth)acrylate and dicyclopentenyl (meth)acrylate,

15 to 35% by mass of a photo-polymerizable poly-functional monomer, and 5 to 15% by mass of an acylphosphine photo-polymerization initiator, and having a viscosity at 25 degree C. of 1 to 50 mPas using an E-type viscometer at a rotor speed of 50 rpm, wherein the photo-polymerizable poly-functional monomer comprises a photo-polymerizable monomer having at least one of functional groups including an amide group and an amino group, and the photo-polymerizable monomer is contained in an amount of 5 to 20% by mass based on a total amount of photo-polymerizable mono-functional monomer and photo-polymerizable poly-functional monomer, wherein the photo-polymerizable monomer having at least one of the functional groups including an amide group and an amino group comprises an acrylated amine compound having two photo-polymerizable functional groups and two amino groups in a molecule thereof.

* * * * *